United States Patent [19]

Mallan et al.

[11] 4,234,388

[45] Nov. 18, 1980

[54] REMOVAL OF CHLORINE FROM PYROLYTIC OILS

[75] Inventors: George M. Mallan, Los Angeles; George T. Preston, Claremont, both of Calif.

[73] Assignee: Occidental Petroleum Corporation, Los Angeles, Calif.

[21] Appl. No.: 65,737

[22] Filed: Aug. 10, 1979

Related U.S. Application Data

[63] Continuation of Ser. No. 863,857, Dec. 20, 1977, abandoned, which is a continuation of Ser. No. 684,644, May 10, 1976, abandoned.

[51] Int. Cl.³ .......................... C10B 57/02; C10G 9/16
[52] U.S. Cl. ........................... 201/25; 48/209; 208/48 Q; 208/341; 201/2.5; 210/765; 210/774; 210/806
[58] Field of Search ............ 210/59, 60, 70–73; 201/25, 31, 2.5; 208/48 Q, 340, 341; 55/71; 48/209

[56] References Cited

U.S. PATENT DOCUMENTS

| 3,284,992 | 11/1966 | Wikman | 55/71 |
|---|---|---|---|
| 3,412,171 | 11/1968 | Welch et al. | 208/341 |
| 3,580,838 | 5/1971 | Lutz | 208/48 Q |
| 3,676,519 | 7/1972 | Dorn et al. | 208/48 Q |
| 3,736,233 | 5/1973 | Sass et al. | 201/31 |
| 3,793,389 | 2/1974 | Oleszko et al. | 208/48 Q |
| 3,846,096 | 11/1974 | Mallan et al. | 48/209 |
| 3,927,986 | 12/1975 | Ishikawa et al. | 201/25 |

FOREIGN PATENT DOCUMENTS

1398858  6/1975  United Kingdom .................... 201/31

*Primary Examiner*—Benoit Castel
*Attorney, Agent, or Firm*—Forrest E. Logan

[57] ABSTRACT

The gas stream obtained from the pyrolysis of solid organic wastes and containing chlorine in the form of hydrogen chloride is processed to obtain a substantially chlorine free pyrolytic oil.

The gas stream is first contacted with a hydrocarbon immiscible with the pyrolytic oils to quench the gas stream and reduce the gas stream temperature close to the dew point of water. This forms a two phase condensate of the quench hydrocarbon and pyrolytic oil. The phases are separated, the pyrolytic oil recovered and the hydrocarbon recycled as the quench. The resultant gas stream is then treated for removal of hydrogen chloride from the gas stream for disposal or recovery of hydrochloric acid.

30 Claims, 4 Drawing Figures

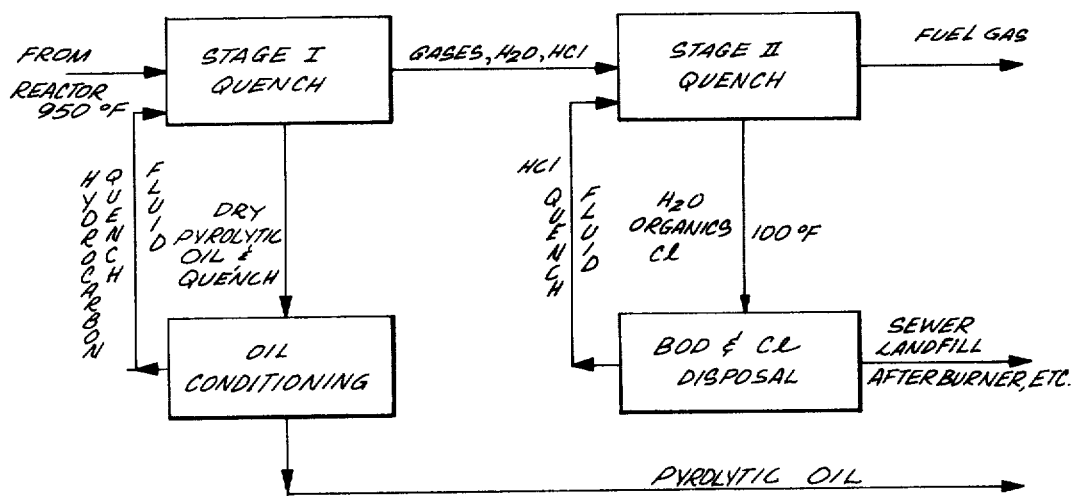
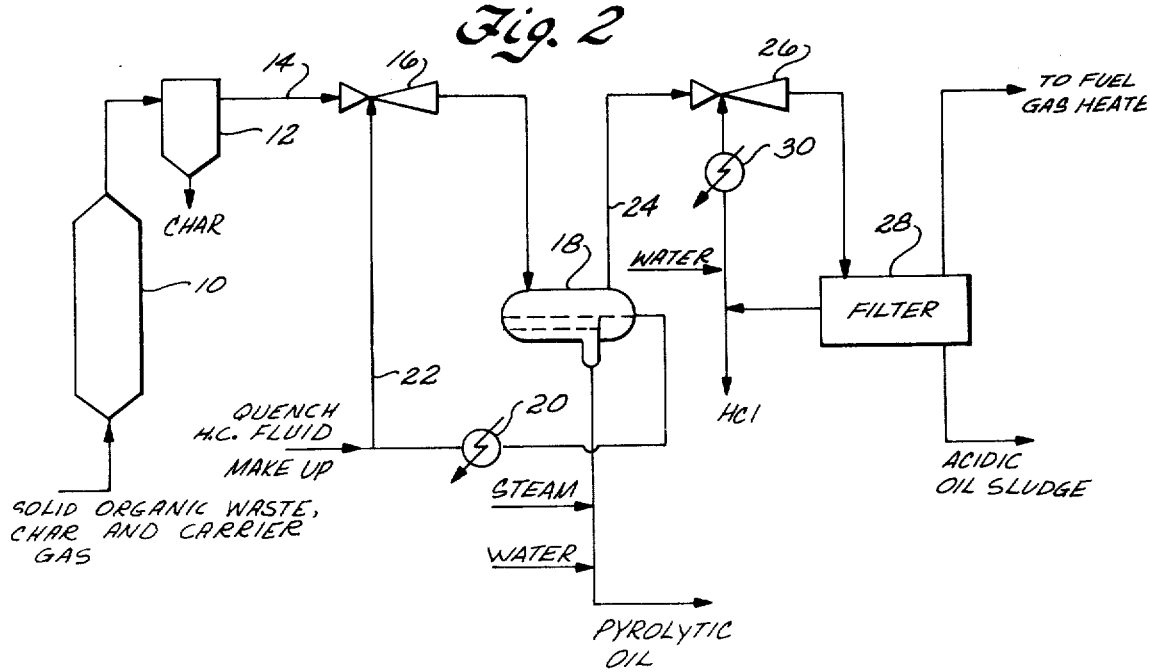

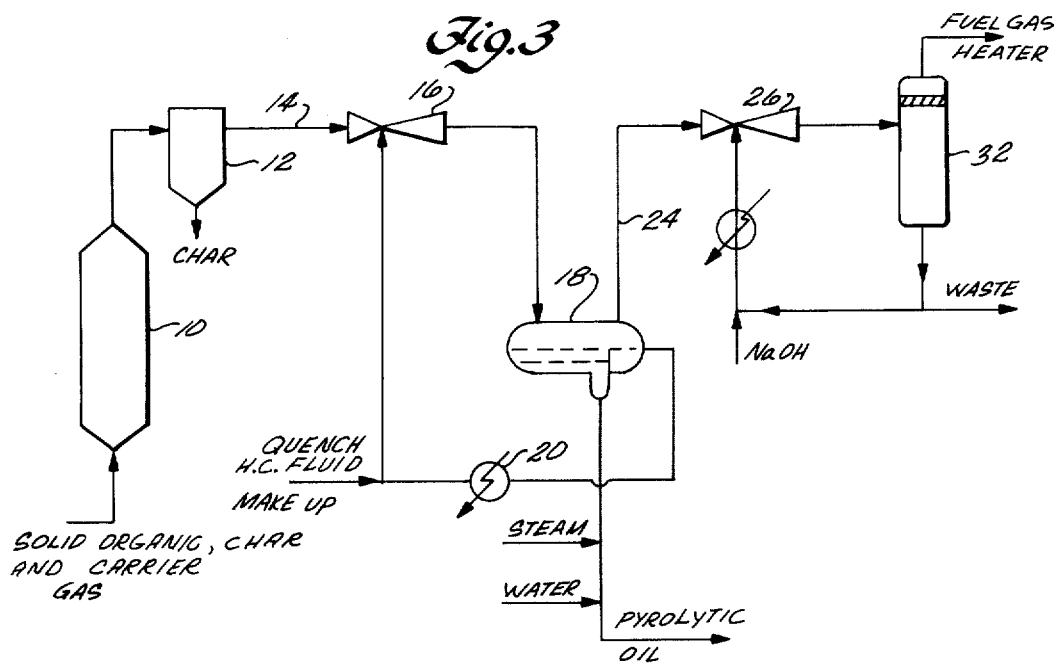
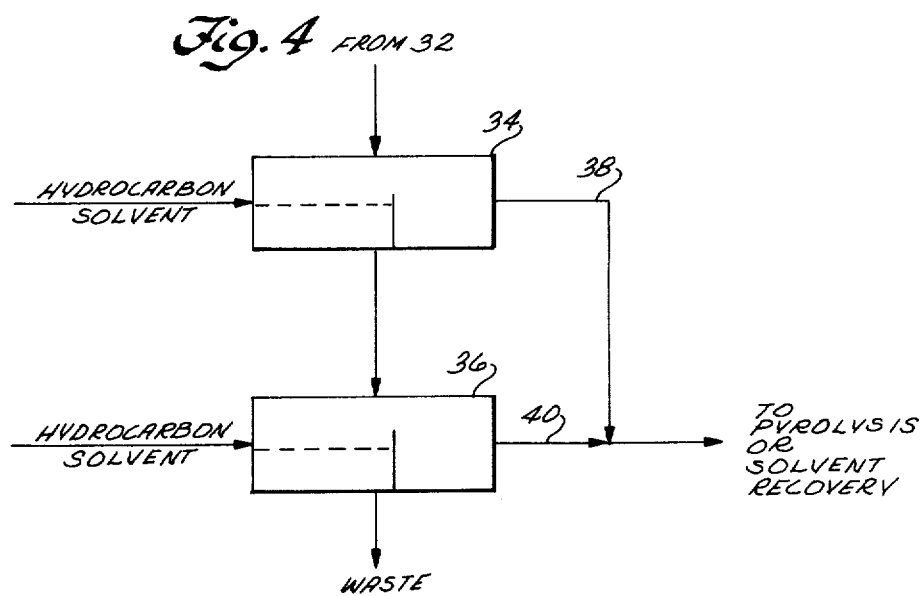

REMOVAL OF CHLORINE FROM PYROLYTIC OILS

CROSS REFERENCE TO RELATED APPLICATIONS

This is a continuation of Application Ser. No. 863,857, filed Dec. 20, 1977, which in turn is a continuation of Application Ser. No. 684,644, filed May 10, 1976, both now abandoned.

BACKGROUND OF THE INVENTION

The present invention is directed to the pyrolysis of solid organic wastes from industrial and municipal sources and to obtaining a chlorine free pyrolytic oil therefrom.

The disposal of wastes both from municipal and industrial sources, such as trash, rubbish, garbage, animal wastes, agricultural wastes, and waste of plastic processing operations is rapidly becoming of immense national concern. The cost of disposal ranks third behind public schooling and highways as municipal expense in the United States.

It is estimated that each individual in the country generates between 3 and 6 pounds of waste per day, and that the industrial output is equivalent to approximately 5 pounds of solid waste per person per day. Previous methods of mass waste disposal, such as landfill are becoming impossible, while others such as incineration are costly and result in air pollution problems.

A vast majority of the waste which is presently disposed of contains products which are immediately recyclable back into the economy or materials which can be converted into products for recycle back to the economy. Directly recyclable constituents are the various metals present, such as aluminum and steel, and glass. For the most part the organic fraction of the waste is subject to pyrolysis following gross recovery of the directly recyclable inorganic fraction. Pyrolysis yields char, pyrolytic oils and gases as products. Pyrolysis in its broadest definition is heating of the organics when in a comminuted state under essentially non-oxidizing conditions to a temperature at which at least devolatilization of the organics occurs. Generally, although no precise transition exists, pyrolysis products will be predominantly liquids at temperatures below about 1200° F. and by gases at temperature above about 1200° F. In solid waste treating operations, the waste material feed to undergo pyrolysis is an essentially solid carbonaceous material consisting of organics and fly ash and particulate inorganics which escape recovery.

A particularly attractive method for converting the solid organic wastes into new and useful products consists of a process where the waste material is first dried and comminuted to a particle size wherein the largest particle has a maximum particle dimension of less than about 1 inch. There is then formed a turbulent gas stream by admixing the dried comminuted waste material with solid heat source and a carrier gas which does not deleteriously react with or oxidize the organic waste materials or products derived therefrom. The mixture is passed through a transport pyrolysis zone where at a temperature between 600° and 2000° F. the organic wastes undergo pyrolysis yielding solid char and vaporized hydrocarbonaceous constituents. The vaporized hydrocarbonaceous constituent is separable into a pyrolytic oil and a normally gaseous hydrocarbonaceous constituent. The gaseous constituent may be recycled to the process and combusted for heat. A portion of the char is also recycled as the heat source or converted by decarbonization into an inert heat source.

The pyrolytic oils formed, while varying in nature depending upon the composition of the waste material processed and pyrolysis conditions employed, are at the same time unique. They may be characterized as an oxygenated, complex organic fluid, typically up to 40% and in some cases up to 85% soluble in water, acids or base. Solubility in polar organic solvents such as glycerol is limited and the pyrolytic oils are relatively insoluble in non-polar organic solvents, such as diesel oil, carbon tetrachloride, pentane, decane, benzene, toluene and hexane. The pyrolytic oil, however, can be successively blended and mixed with various #6 fuel oils. Combustion stability of the mixture is about the same as that of #6 fuel oil.

A typical example of an elemental analysis of the pyrolytic oil is that obtained from the pyrolysis of a waste material containing about 70% cellulosics. The oil thus obtained will contain from about 52 to about 60% carbon, from about 6 to about 8% hydrogen, from about 1 to about 2% nitrogen and from about 29 to about 33% oxygen. The empirical formula which best fits the pyrolytic oil analysis is $C_5H_8O_2$. Specific gravities range from about 1.1 to about 1.4.

Municipal and industrial wastes can contain various quantities of chlorine. Chlorine sources range from plastics such as polyvinyl chloride to animal feed lot wastes. One municipality has estimated that the chlorine content of trash will range from 0.7 to about 1.8% by weight, with a mean estimate of 1.3%. Considering a 500 ton per day plant processing municipal waste, the potential hydrogen chloride output from the plant amounts to 6.7 tons per day.

Not only is the hydrogen chloride worth recovering as hydrochloric acid, but also presents problems of corrosion and secondary disposal problems from a pollution standpoint which must be coped with.

At the same time, hydrogen chloride should not be recovered as a component of the pyrolytic oil, since one of the principal end uses for the pyrolytic oil is as a fuel oil. Understandably, it would also be desirable to have the vent gases from the combustion of the fuel essentially free of hydrogen chloride from both a corrosion and pollution standpoint.

SUMMARY OF THE INVENTION

According to the present invention, there is provided a process for the removal of hydrogen chloride from gas streams generated in the pyrolysis of solid organic wastes.

The process of the invention is directed to any operation where a solid organic waste is comminuted to a particle size sufficiently low to enable pyrolysis and passed through a pyrolysis zone where vapor residence time is sufficiently low to prevent substantial cracking of hydrocarbon products and where there is formed a char, a condensible pyrolytic oil, water and a normally gaseous hydrocarbon fuel. An additional component of the gaseous effluent of the pyrolysis zone is hydrogen chloride.

The pyrolysis zone may be a transport zone such as a tubular reactor, a fluidized bed, or a rotary kiln. The solid waste to undergo pyrolysis is normally transported to the pyrolysis zone by a carrier gas. While it is preferred that the carrier gas be non-deleteriously reactive with the products of pyrolysis, oxidizing constituents may be present so long as they are consumed and do not lead to incinerating conditions. The pyrolysis zone may be heated externally by the carrier gas and/or a solid heat source. A solid heat source is preferred and most expeditiously is organic (char) or an inorganic solid, preferably derived from decarbonization of a mixture of char and the comminuted inorganics entrained by the solid waste.

In carrying out the process of the invention, the effluent from the pyrolysis zone is passed, if necessary, through a char separation zone where product char and the solid heat source, if used, are separated from the product stream.

The gas stream is then passed through a pyrolytic oil quench zone when it is brought into contact with a relatively cool stream of a hydrocarbon fluid which is immiscible with the pyrolytic oil. The hydrocarbon fluid reduces the temperature of a gas stream to below the condensation temperature of a substantial amount of the pyrolytic oil constituents, but above the dew point of water. Generally, the temperature will be from about 10° to about 50° F. and preferably about 10° to about 30° F. above the dew point of water to allow a substantial portion of the hydrocarbon values produced during pyrolysis to condense as pyrolytic oil with the hydrocarbon quench fluid. Being immiscible, the mixture is amenable to phase separation techniques. The pyrolytic oil, upon separation, is processed for its end use and the hydrocarbon quench fluid recycled back to the pyrolytic oil quench zone.

The gas stream leaving from the pyrolytic oil quench zone is passed to a hydrogen chloride quench zone where it is brought into contact with an aqueous solution capable of extracting hydrogen chloride from the gas stream. The aqueous solution containing extracted hydrogen chloride is processed for the recovery of hydrochloric acid or for the formation of inert chloride salts and for the elimination of entrained organic constituents.

The balance of the gas stream which is substantially free of hydrogen chloride, depending on its composition, is recovered as such or recycled to the pyrolysis process as a fuel gas.

The hydrocarbon fluids used to quench the gas stream for the quench recovery of pyrolytic oils are high boiling hydrocarbons, such as diesel oil, pentane, decane, benzene, toluene, dodecane, hexane, and like non-polar hydrocarbon fluids.

The pyrolytic oil which separates from the hydrocarbon quench fluid because of substantial mutual immiscibility is normally treated by the addition of water alone or by the addition of steam followed by water to reduce its viscosity to render it more fluid for passage to an end product processing stage where it may, for instance, be blended with a fuel oil. If the desired end use for the pyrolytic oil is to blend it with a fuel oil, the fuel oil itself may serve as a quench fluid.

Several expedients are available for the treatment of the hydrogen chloride contained in a gas stream following condensation of the pyrolytic oil.

One method involves continuous circulation of an aqueous solution of hydrogen chloride as the hydrogen chloride quench solution. The solution containing hydrogen chloride is continuously filtered to remove entrained organics as an acidic sludge which may be dried and recycled back to the pyrolysis zone. Hydrogen chloride concentrates in the aqueous quench solution and may be recovered as hydrochloric acid.

Another method is to add, as the quench, an aqueous solution of a base, such as sodium hydroxide, which reacts with the extracted hydrogen chloride to form a saline solution which after separation from the gas stream is discarded as waste. The hydrocarbons extracted are normally biodegradable and can be conveniently disposed of with the waste or separated from the waste saline solution.

By the practice of the process of this invention, hydrogen chloride generated in substantial quantities in the process of municipal waste can be recovered as a useful end product such as hydrochloric acid or safely treated for disposal.

THE DRAWINGS

FIG. 1 is a general schematic flow diagram for the process of this invention.

FIG. 2 is a more detailed flow diagram for the process of this invention illustrating a technique for recovery of hydrochloric acid as a product.

FIG. 3 is an embodiment of FIG. 2 illustrating the method for treatment of the hydrogen chloride with a base to neutralize it for disposal.

FIG. 4 schematically illustrates a method of treating the aqueous quench product for recovery of an organic constituent and a neutralized product for disposal.

DESCRIPTION

According to the present invention, there are provided improvements to processes for the pyrolysis of solid organic waste to separate hydrogen chloride from the pyrolysis products.

The processes to which the invention is adapted generally consists of processing as received solid waste for separation into a generally inorganic fraction containing recyclable values and solid organic waste fraction for pyrolysis. The solid organic waste fraction to undergo pyrolysis can be the entire organic portion of the waste or the residue resulting from processes for recovery of recyclable organic values, as for instance, by the pulping of the cellulosic fraction of the solid waste to form paper pulp.

In the pyrolysis process employed, the organic portion of the municipal waste is dried and comminuted to provide particles having a maximum dimension set about 1 inch, and preferably the particles have a maximum dimension of 0.25 inch or less, more preferably with particle size less than 28 mesh. By the term, "maximum dimension" there is meant the largest dimension, e.g. length, width or thickness of the individual particles, should not exceed this limit.

The individual particles may have smaller dimensions and consist of "chunks" which have three dimensions, paper stock, polymeric films, leaves which have two dimensions and filaments which essentially have only one dimension.

As used herein by the term, "solid organic wastes", there is meant municipal and industrial wastes which contain cellulosic materials, plastics, rubber stock, and animal wastes. Included in the meaning of "cellulosic materials" are paper, tree bark, crop wastes, vegetable and fruit wastes, vegetable and fruit processing wastes, tree bark, tree trimming, saw dust and the like. "Plastics" include discarded household plastics as well as the waste of industrial polymer forming and processing operations. A particular hydrogen chloride contributing ingredient is polyvinyl chloride. "Rubber stock" includes waste tires from which the carbon filler can be recovered as char or recycle carbon filler. "Animal wastes" includes household discards, slaughter house wastes, poultry processing wastes, manure and the like.

After comminution and drying, the solid organic waste fraction which includes the fly ash and also inorganics which escape recovery, mainly fine glass particles, are pyrolyzed at temperatures ranging from about 600° to about 2000° F. under conditions where residence time of product vapors in the pyrolysis zone is short, typically from about 0.1 to 10.0 seconds, preferably 0.1 to 2.0 seconds. This is to prevent cracking of hydrocarbon products. After pyrolysis the effluent may be immediately quenched to reduce product gas temperature to below the pyrolysis temperature to prevent cracking ahead of recovery operations.

For pyrolysis there may be employed tubular or transport reactors, fluidized or entrained bed reactors, rotary kilns and the like. Tubular or transport reactors are preferred. For fluidized or entrained bed reactors and rotary kilns, solids residence time may be long provided product vapor residence time is short.

The pyrolysis zone may be externally or internally heated. Internal heating may be realized for instance by making the carrier gas for the solid waste partially oxidizing to generate heat by partial oxidation. Incineration conditions, however, are to be avoided and insured by complete consumption of the oxidant early in the pyrolysis zone. In the outlet, therefore, the gaseous products will not be deleteriously reactive with respect to the products of pyrolysis.

The preferred source of heat is inert solids. A conventional source is the char product of pyrolysis. Another source of heat is the product obtained by decarbonization of the solid residue of pyrolysis. Because the inorganics present in the feed will remain in admixture with the char, but are of materially higher bulk density, removal of the carbon will increase effective bulk density and make the inorganic residue most efficient as the heat source in transport reactors. Other heat sources such as sand, glass particles and the like may also be used.

For transport reactors, the solid waste with a carrier gas and heat source are passed through the pyrolysis zone under turbulent flow conditions. Reynolds numbers range from 2000 to above 200,000. Laminar flow conditions are to be avoided as limiting heat transfer within the pyrolysis zone.

A typical feed to a pyrolysis zone consists of about 0.2 to about 2 pounds of carrier gas per pound of solid organic waste. The carrier gas employed to transport the char and the comminuted solid organic waste through the pyrolysis zone is one which will normally not deleteriously react with the products of pyrolysis. The gas stream can contain reactive constituents, however, such as carbon monoxide which will react with the hydrocarbons formed during pyrolysis to convert them to other useful hydrocarbons. A totally inert carrier gas such as nitrogen can also be used.

Where the heat required for pyrolysis is provided by particulate solids, the solids may be directly heated by total or partial oxidation of the pyrolysis char and/or indirectly heated by the products of combustion of hydrocarbon fuel including the effluent gases from the pyrolysis operation.

The effluent from the pyrolysis zone is composed of char, the solid source of heat if present and different from char, a condensable pyrolytic oil which is used for its fuel or chemical values, water as steam, and a normally gaseous constituent which includes the carrier gas and has higher heating value of about 250 to 550 BTU/cu. ft. It can, depending on pyrolysis conditions, contain valuable olefin constituents.

By the term "pyrolytic oil" there is meant the normally condensible fluid as opposed to gaseous or free solid, i.e. char segment of the pyrolysis operation. It is typically highly oxygenated, but low in bound sulfur and the halogens. It is as much as 85%, more typically up to 40% soluble in water, acids and bases. Having a typical empirical formula of about $C_5H_8O_2$, it is relatively insoluble in non-polar organic solvents, but compatible with fuel oils. Specific gravity is in excess of 1.0 usually from about 1.1 to about 1.4.

The general scheme for the treatment of the effluent of a pyrolysis zone following char and solid particulate heat source separation is depicted in FIG. 1. The product at the pyrolysis temperature, e.g. 950° F. is passed to a Stage I Quench. In the Stage I Quench, the gas stream is brought into contact with a hydrocarbon fluid which is immiscible with the pyrolytic oils. In the Stage I Quench the gas stream is cooled to below the condensation temperature of the pyrolytic oil, but above the dew point of water. Typically, the gas stream is cooled to a temperature from about 10° to about 30° F. above the dew point of water at operating pressures.

By the term "quench hydrocarbon fluid" there is meant a hydrocarbon which is substantially immiscible in the pyrolytic oil, liquid at ambient temperatures and has a low vapor pressure at the resultant temperature of Stage I Quench. As quench hydrocarbon fluids there may be mentioned diesel oil, pentane, decane, dodecane, benzene, hexane, toluene and the like. As these materials have intrinsic value greater than the pyrolytic oil immiscibility is essential to enable their continuous cycle as quench and recovery at the end of the process.

The condensate from Stage I Quench which is an immiscible mixture of the quench hydrocarbon fluid and the pyrolytic oil is passed to an oil conditioning zone. The hydrocarbon quench fluid is separated by decanting and like phase separation techniques for recycle back to the Stage I Quench and the pyrolytic oil recovered.

The gas stream from the Stage I Quench still containing the vaporized water as steam, hydrogen chloride and carrier gas is passed to a Stage II Quench where the gas stream is reduced to a temperature below the dew point of water, by contact with an aqueous HCl quench fluid which is capable of extracting hydrogen chloride from the gas phase and dissolving the extracted HCl.

The aqueous quench fluid containing hydrogen chloride from Stage II Quench, as shown in FIG. 1, contains extracted organics, typically biodegradable materials and chlorides which are neutralized to enable disposal. Other processing measures are described below.

The resultant gas stream typically at a temperature of 100° F. and containing fuel values may be recovered as such or recycled back to pyrolysis process to serve as the fuel to provide the heat required for pyrolysis.

FIG. 2 illustrates in greater detail, one preferred route to carry out the process of this invention.

With reference thereto, the comminuted solid organic waste, the solid heat source and carrier gas are passed through pyrolysis zone 10, where the solid organic waste undergoes pyrolysis to yield the effluent as described above. The effluent is passed through solids separator 12, typically a cyclone separator, where substantially all of the solids present in the effluent are recovered. Normally, a portion of the char formed is recycled to generate heat for the pyrolysis reactor and the balance recovered as product. The resultant gaseous stream is then passed by line 14 to venturi quench scrubber 16. There is introduced into the venturi quench scrubber 16, the quench hydrocarbon fluid which is substantially immiscible with the pyrolytic oil to be recovered.

The hydrocarbon fluid should, as indicated, have a boiling point above the resultant quench temperature which is close to, but above the dew point of water in the gas stream. The hydrocarbon fluid is introduced in an amount sufficient to cool the gas to a temperature of about 10° to about 50° F. preferably from 10° to 30° F. above the dew point of water at operating pressures. This causes the normally condensible hydrocarbon constituents of the pyrolysis products to condense as pyrolytic oil and form a two phase mixture or emulsion with the hydrocarbon quench fluid in separator 18. The upper phase is the hydrocarbon quench fluid which is recycled after cooling in heat exchanger 20 by line 22 back to venturi scrubber 16. Some make-up may be required. Pyrolytic oil which separates is recovered from the base of separator 18. Steam and/or water is then added to the pyrolytic oil to reduce its viscosity to permit passage to a processing zone (not shown). In the preferred embodiment, steam is injected into the pyrolytic oil followed by introduction of water, both of which are free from chlorine to raise the moisture content of the pyrolytic oil. The relative amounts of steam and water are selected to control final temperature of the pyrolytic oil.

The gaseous effluent from separator 18 is passed by line 24 to a second venturi scrubber 26 where it is brought into contact with a cooled aqueous hydrochloric acid solution. The added hydrochloric acid solution reduces the gas temperature below the dew point of water, typically to a temperature of about 100° F. The liquid effluent from venturi scrubber 26 is passed to filtration zone 28 where entrained low boiling organics are separated as an acid sludge for ultimate recycle to pyrolysis zone 10.

By cycling the aqueous hydrogen chloride solution with intermediate cooling in heat exchanger 30 through venturi scrubber 26, the hydrogen chloride content of an aqueous phase is continuously increased to the point where it reaches a saleable level. A portion is recovered as a hydrochloric acid product and water added to supplant it. The effluent gases from filter 28 have a heating value of about 250 to 550 BTU cu. ft. and are normally recycled back to the pyrolysis operation to provide in part at least a portion of the heat required to heat the char necessary for pyrolysis.

FIG. 3 represents still another route to the separation of hydrogen chloride from the gas stream. The process up to introduction of the gas stream into venturi scrubber 26 is identical to that shown in FIG. 2.

In venturi scrubber 26, there is introduced an aqueous base capable of reacting with extracted hydrogen chloride to form water soluble chloride salts. Preferably, there is employed an aqueous caustic solution as shown.

The effluent from the venturi scrubber 26 is passed to phase separator 32 to permit the aqueous phase to separate from the gaseous phase which is recycled back to the pyrolysis zone. The neutralized aqueous phase may then be discarded as waste.

Phase separator 32 may, for instance, have associated with it a cyclone separator, demister pads, baffles and the like to cause coalescence and condensation of liquid droplets contained in the gas stream.

A portion of the aqueous phase collected in phase separator 32 is recycled as part of the quench and the balance discarded as waste. Since a major portion of the solution can be continuously recycled to collect and concentrate hydrogen chloride for reaction with the introduced base, the amount discarded is relatively low in volume. The discarded aqueous solution will have high concentrates of organic constituents and chloride salts. A major portion of the organic constituents are biodegradable, and can be discarded safely to waste.

FIG. 4 illustrates a scheme to minimize the biodegradable organic content of the waste water stream to minimize the cost of disposal of the aqueous chloride containing solution. The drawn off aqueous liquor from phase separator 32 enters extraction separators 34 and 36 in series. There is introduced to each a low cost hydrocarbon solvent which is water immiscible and capable of extracting the organic constituents from the neutral aqueous phase. Light paraffin hydrocarbons and aromatic hydrocarbons can effectively be used.

As is shown in FIG. 4, the aqueous effluent from separator 34 is passed to separator 36 while the introduced hydrocarbon solvent and extracted organics are passed by line 38 back to the pyrolysis zone and/or to a solvent recovery stage where the hydrocarbon solvent is recovered and recycled. Independent of whether the solvent is recovered, the extracted organics are normally sent back to the pyrolysis zone, for example, as a fuel.

To extract the additional hydrocarbons from the aqueous phase, the aqueous phase from extraction zone 34 is passed through an extraction zone 36, where it is brought into contact with the same or a different solvent. The solvent removes to the maximum extent the balance of the hydrocarbons entrained in the aqueous waste solution before it is discarded. The organic fraction is continuously withdrawn for recovery of the solvent and/or for passage to the pyrolysis zone.

In addition to the scheme shown in FIG. 4, other means may be employed for separation of the biodegradable organic constituents contained in the waste water streams. The waste water stream may, for instance, be treated with a coagulant capable of causing flocculation of the entrained organic constituents yielding a clarified overflow to be discarded. Filtration, carbon absorption, ion exchange, sludge thickening, reverse osmosis, and ozonation or oxidation steps can also be employed.

While the invention has been described in terms of using an immiscible hydrocarbon to condense the pyrolytic oil, where the pyrolytic oil is to be used as a fuel supplement, a miscible hydrocarbon fuel may be used instead. In this instance, the hydrocarbon mixes with the pyrolytic oil in the venturi scrubber and the mixture recovered directly as a fuel.

EXAMPLE

In a pyrolysis zone a dry feed lot waste having a chlorine content of about 1.7% was comminuted to a size less than 24 mesh and pyrolyzed in a pyrolysis zone in which pyrolysis temperature was about 950° F.

The effluent from the pyrolysis zone was processed for separation of char and passed to a collection system containing three condensers in series followed by a filter and electrostatic precipitator to trap aerosols, and aerosol and water vapor sampling devices. Vapors leaving the first condenser were above the dew point of water in the gas stream, and vapors leaving the third condenser were approximately at the dew point of water.

The products recovered and/or sampled in each section of the collection system were analyzed for free chloride ion and for water content. From these analyses there was calculated the percentage of the dry Cl⁻ free oil, the percentage of the water, and the percentage of the free chloride ion, collected in each section. These results are shown in Table I below. The portion of the water collected in Condenser 1 is quite small compared to the portion of the oil collected in Condenser 1; likewise the portion of the free chloride ion collected in Condenser 1 is smaller than the portion of the oil collected in Condenser 1. In the section comprising Condensers 2 and 3, the portions of oil, water and free chloride collected are all of the same magnitude. The greatest portion of the water was collected or otherwise found in the filter, precipitator and vent gas, and similarly most of the free chloride ion was found in that section; while only about half the oil was collected in that section.

These results established the advantage of a two stage quench of pyrolysis reactor effluents in minimizing the chloride content of the final oil product.

TABLE I

| | % of Dry Oil Collected in Section | % of H$_2$O Collected in Section | % of Cl⁻ Collected in Section |
|---|---|---|---|
| Condenser 1 | 32.2 | 0.3 | 10.7 |
| Condensers 2 & 3 | 17.6 | 13.9 | 21.3 |
| Filter, Electrostatic Precipitator and Vent | 50.2 | 85.8 | 68.0 |
| | 100.0 | 100.0 | 100.0 |

What is claimed is:

1. In a process for the pyrolysis of solid organic wastes which includes solid organic wastes which yield hydrogen chloride upon pyrolysis, and wherein dried, comminuted solid organic waste is passed through a pyrolysis zone maintained at a temperature from about 600° F. to about 2000° F. to form a pyrolysis product stream which comprises char and a gaseous component comprising water vapor, hydrogen chloride, and organic constituents comprising biodegradable organic constituents, a condensible pyrolytic oil and hydrocarbons, the method of recovering the condensible pyrolytic oil and a gaseous residue substantially free of hydrogen chloride which comprises:
   (a) separating the char from the pyrolysis product stream to form a char-free pyrolysis effluent;
   (b) contacting the char-free pyrolysis effluent with a hydrocarbon quench fluid which is substantially immiscible in pyrolytic oil in a pyrolytic oil quench zone to cool the char-free pyrolysis effluent to a temperature above the dew point of water and below the condensation temperature of a substantial portion of the condensible pyrolytic oil to form a two-phase immiscible liquid mixture of pyrolytic oil and the hydrocarbon quench fluid and leave a gaseous residue comprising hydrogen chloride, water vapor and organic constituents;
   (c) separating the hydrocarbon quench fluid from the pyrolytic oil to recover the pyrolytic oil and recycling the separated hydrocarbon quench fluid to the pyrolytic oil quench zone; and
   (d) passing the gaseous residue to a hydrogen chloride quench zone where the gaseous residue is contacted with an aqueous hydrogen chloride quench solution to cool the gaseous residue below the dew point of water to condense water vapor and extract hydrogen chloride from the gaseous residue.

2. A process as claimed in claim 1 in which the aqueous hydrogen chloride quench solution is a hydrochloric acid solution which is concentrated by the extracted hydrogen chloride.

3. A process as claimed in claim 2 in which the char-free pyrolysis effluent is cooled in the pyrolytic oil quench zone to a temperature from about 10° F. to about 50° F. above the dew point of water.

4. A process as claimed in claim 2 in which the hydrochloric acid solution extracts organic constituents from the gaseous residue and wherein the extracted organic constituents are filtered from the hydrochloric acid solution as an acidic oil sludge which is recycled to the pyrolysis zone.

5. A process as claimed in claim 1 in which the aqueous hydrogen chloride quench solution is a base and forms chloride salts with the extracted hydrogen chloride.

6. A process as claimed in claim 5 in which the aqueous hydrogen chloride quench solution is a solution containing sodium hydroxide.

7. A process as claimed in claim 5 in which the char-free pyrolysis effluent is cooled in the pyrolytic oil quench zone to a temperature from about 10° F. to about 50° F. above the dew point of water.

8. A process as claimed in claim 5 in which the aqueous hydrogen chloride quench solution extracts organic constituents comprising biodegradable organic constituents from the gaseous residue and in which the extracted organic constituents are extracted from the aqueous hydrogen chloride quench solution by contact with a water immiscible organic solvent for the organic constituents.

9. In a process for the pyrolysis of solid organic wastes which includes solid organic wastes which yield hydrogen chloride upon pyrolysis, and wherein dried, comminuted solid organic waste is passed through a pyrolysis zone maintained at a temperature from about 600° F. to about 2000° F. to form a pyrolysis product stream which comprises char and a gaseous component which comprises water vapor, hydrogen chloride, and organic constituents comprising biodegradable organic constituents, a condensible pyrolytic oil and hydrocarbons, the method of recovering the condensible pyrolytic oil and a gaseous residue substantially free of hydrogen chloride which comprises:
   (a) separating the char from the pyrolysis product stream to form a char-free pyrolysis effluent;
   (b) contacting the char-free pyrolysis effluent with a hydrocarbon fuel oil which is miscible in pyrolytic oil in a pyrolytic oil quench zone to cool the char-free pyrolysis effluent to a temperature above the dew point of water and below the condensation temperature of the condensible pyrolytic oil to form a one phase liquid mixture of pyrolytic oil and hydrocarbon fuel oil and leave a gaseous residue comprising hydrogen chloride, water vapor and organic constituents;

(c) recovering the hydrocarbon fuel oil and the pyrolytic oil from the pyrolytic oil quench zone; and (d) passing the gaseous residue to a hydrogen chloride quench zone where the gaseous residue is contacted with an aqueous hydrogen chloride quench solution to cool the gaseous residue below the dew point of water to condense water and extract hydrogen chloride from the gaseous residue.

10. A process as claimed in claim 9 in which the char-free pyrolysis effluent is cooled in the pyrolytic oil quench zone to a temperature from about 10° F. to about 50° F. above the dew point of water.

11. A process as claimed in claim 9 in which the aqueous hydrogen chloride quench solution is a hydrochloric acid solution which is concentrated by the extracted hydrogen chloride.

12. A process as claimed in claim 11 in which the char-free pyrolysis effluent is cooled in the pyrolytic oil quench zone to a temperature from about 10° F. to about 50° F. above the dew point of water.

13. A process as claimed in claim 11 in which the hydrochloric acid solution extracts organic constituents from the gaseous residue and wherein the extracted organic constituents are filtered from the hydrochloric acid solution as an acidic oil sludge which is recycled to the pyrolysis zone.

14. A process as claimed in claim 9 in which the aqueous hydrogen chloride quench solution is a base and forms chloride salts with the extracted hydrogen chloride.

15. A process as claimed in claim 14 in which the aqueous hydrogen chloride quench solution is a solution containing sodium hydroxide.

16. A process as claimed in claim 14 in which the char-free pyrolysis effluent is cooled in the pyrolytic oil quench zone to a temperature from about 10° F. to about 50° F. above the dew point of water.

17. A process as claimed in claim 14 in which the aqueous hydrogen chloride quench solution extracts organic constituents comprising biodegradable organic constituents from the gaseous residue and in which the extracted organic constituents are extracted from the aqueous hydrogen chloride quench solution by contact with a water immiscible organic solvent for the organic constituents.

18. In a process for the pyrolysis of solid organic wastes which includes solid organic wastes which yield hydrogen chloride upon pyrolysis, and wherein dried, comminuted solid organic waste, hot char and a carrier gas which is non-deleteriously reactive with respect to pyrolysis products are combined and passed under turbulent flow conditions through a pyrolysis zone maintained at a temperature from about 600° F. to about 2000° F. to form a pyrolysis product stream which comprises char and a gaseous component comprising water vapor, hydrogen chloride, and organic constituents comprising biodegradable organic constituents, a condensible pyrolytic oil and hydrocarbons, the method of recovering the condensible pyrolytic oil and a gaseous residue substantially free of hydrogen chloride which comprises:

(a) separating the char from the pyrolysis product stream to form a char-free pyrolysis effluent;

(b) contacting the char-free pyrolysis effluent with a hydrocarbon quench fluid which is substantially immiscible in pyrolytic oil in a pyrolytic oil quench zone to cool the char-free pyrolysis effluent to a temperature above the dew point of water and below the condensation temperature of a substantial portion of the condensible pyrolytic oil to form a two-phase immiscible liquid mixture of pyrolytic oil and the hydrocarbon quench fluid and leave a gaseous residue comprising hydrogen chloride, water vapor and organic constituents;

(c) separating the hydrocarbon quench fluid from the pyrolytic oil to recover the pyrolytic oil and recycling the separated hydrocarbon quench fluid to the pyrolytic oil quench zone; and (d) passing the gaseous residue to a hydrogen chloride quench zone where the gaseous residue is contacted with an aqueous hydrogen chloride quench solution to cool the gaseous residue below the dew point of water to condense water vapor and extract hydrogen chloride from the gaseous residue.

19. A process as claimed in claim 18 in which the aqueous hydrogen chloride quench solution is a hydrochloric acid solution which is concentrated by the extracted hydrogen chloride.

20. A process as claimed in claim 19 in which the hydrochloric acid solution extracts organic constituents from the gaseous residue and wherein the extracted organic constituents are filtered from the hydrochloric acid solution as an acidic oil sludge which is recycled to the pyrolysis zone.

21. A process as claimed in claim 18 in which the aqueous hydrogen chloride quench solution is a base and forms chloride salts with the extracted hydrogen chloride.

22. A process as claimed in claim 21 in which the aqueous hydrogen chloride quench solution is a solution containing sodium hydroxide.

23. A process as claimed in claim 21 in which the aqueous hydrogen chloride quench solution extracts organic constituents comprising biodegradable organic constituents from the gaseous residue and in which the extracted organic constituents are extracted from the aqueous hydrogen chloride quench solution by contact with a water immiscible organic solvent for the organic constituents.

24. In a process for the pyrolysis of solid organic wastes which includes solid organic wastes which yield hydrogen chloride upon pyrolysis, and wherein dried, comminuted solid organic waste, hot char and a carrier gas which is non-deleteriously reactive with respect to pyrolysis products are combined and passed under turbulent flow conditions through a pyrolysis zone maintained at a temperature from about 600° F. to about 2000° F. to form a pyrolysis product stream which comprises char and a gaseous component comprising water vapor, hydrogen chloride, and organic constituents comprising biodegradable organic constituents, a condensible pyrolytic oil and hydrocarbons, and method of recovering the condensible pyrolytic oil and a gaseous residue substantially free of hydrogen chloride which comprises:

(a) separating the char from the pyrolysis product stream to form a char-free pyrolysis effluent;

(b) contacting the char-free pyrolysis effluent with a hydrocarbon fluid which is miscible in pyrolytic oil in a pyrolytic oil quench zone to cool the char-free pyrolysis effluent to a temperature above the dew point of water and below the condensation temperature of the condensible pyrolytic oil to form a one-phase liquid mixture of pyrolytic oil and hydrocarbon fluid and leave a gaseous residue comprising hydrogen chloride, water vapor and organic constituents;

(c) recovering the condensed pyrolytic oil from the pyrolytic oil quench zone; and (d) passing the gaseous residue to a hydrogen chloride quench zone where the gaseous residue is contacted with an aqueous hydrogen chloride quench solution to cool the gaseous residue below the dew point of water to condense water vapor and extract hydrogen chloride from the gaseous residue.

25. A process as claimed in claim 24 in which the char-free pyrolysis effluent is cooled in the pyrolytic oil quench zone to a temperature from about 10° F. to about 50° F. above the dew point of water.

26. A process as claimed in claim 24 in which the aqueous hydrogen chloride quench solution is a hydrochloric acid solution which is concentrated by the extracted hydrogen chloride.

27. A process as claimed in claim 16 in which the hydrochloric acid solution extracts organic constituents from the gaseous residue and wherein the extracted organic constituents are filtered from the hydrochloric acid solution is an acidic oil sludge which is recycled to the pyrolysis zone.

28. A process as claimed in claim 26 in which the aqueous hydrogen chloride quench solution is a base and forms chloride salts with the extracted hydrogen chloride.

29. A process as claimed in claim 28 in which the aqueous hydrogen chloride quench solution is a solution containing sodium hydroxide.

30. A process as claimed in claim 28 in which the aqueous hydrogen chloride quench solution extracts organic constituents comprising biodegradable organic constituents from the gaseous residue and in which the extracted organic constituents are extracted from the hydrogen chloride quench solution by contact with a water immiscible organic solvent for the organic constituents.

* * * * *